United States Patent Office 3,705,159
Patented Dec. 5, 1972

3,705,159
HERBICIDAL 2,4-DI(SUBSTITUTED) AMINO-6-CHLORO PYRIMIDINES
Rupert Schneider, Riehen, Switzerland, assignor to Sandoz Ltd. (also known as Sandoz AG), Basel, Switzerland
No Drawing. Filed Mar. 1, 1971, Ser. No. 119,872
Claims priority, application Switzerland, Mar. 5, 1970, 3,201/70
Int. Cl. C07d 51/42
U.S. Cl. 260—256.4 N          10 Claims

ABSTRACT OF THE DISCLOSURE

The invention concerns novel compounds of the formula:

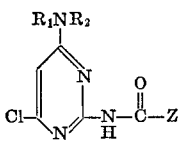

wherein
$R_1$ is hydrogen or alkyl of 1 to 6 carbon atoms,
$R_2$ is alkyl of 1 to 6 carbon atoms, and
Z is alkoxy of 1 to 6 carbon atoms, phenyl, phenoxy, monoalkylamino of 1 to 6 carbon atoms, dialkylamino, each alkyl substituent thereof having 1 to 6 carbon atoms, alkyl of 1 to 6 carbon atoms, or halogenated alkyl of 1 to 6 carbon atoms, and agriculturally acceptable acid addition salts thereof. The compounds are herbicides, and possess a selective herbicidal effect in cotton, potato, leek and maize crops.

IMPROVEMENTS IN OR RELATING TO ORGANIC COMPOUNDS

This invention relates to pyrimidine derivatives.
The invention provides compounds of Formula I,

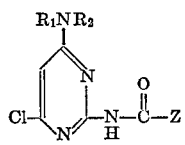   I wherein
$R_1$ is hydrogen or alkyl of 1 to 6 carbon atoms,
$R_2$ is alkyl of 1 to 6 carbon atoms, and
Z is alkoxy of 1 to 6 carbon atoms, phenyl, phenoxy, monoalkylamino of 1 to 6 carbon atoms, dialkylamino, each alkyl substituent thereof having 1 to 6 carbon atoms, alkyl of 1 to 6 carbon atoms, or halogenated alkyl of 1 to 6 carbon atoms, and acid addition salts thereof.
The alkyl significances of $R_1$, $R_2$ and Z, or the alkoxy, monoalkylamino or dialkylamino significances of Z may be branched or unbranched.
The invention also provides a process for the production of the compounds of Formula I and acid addition salts thereof, which comprises reacting a 2-amino-4-alkylamino- or -dialkylamino-6-chloropyrimidine of Formula II,

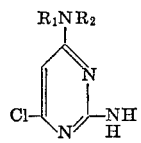   II wherein $R_1$ and $R_2$ are as defined above, with an acid halide of Formula III,

   III wherein X is halogen, preferably chlorine, and Z is as defined above, in an inert solvent, preferably in the presence of a suitable base, e.g., triethyl amine.
The reaction may be conveniently effected at any temperature between room temperature and the boiling point of the reaction mixture.
The production of 2,4-diamino-6-chloropyrimidines of Formula II may be effected by reacting a 2-amino-4,6-dichloropyrimidine with two mols of a corresponding amine $HNR_1R_2$ in alcohol, preferably at the boil, and working up in the usual manner, or by reaction of a 4-alkylamino- or 4 - dialkylamino-2,6-dichloropyrimidine with a concentrated, aqueous ammonia solution in an inert, water-miscible solvent, e.g. alcohol, in a pressure vessel at a temperature of about 100° to 180° C., and subsequently working up in the usual manner.
The compounds of Formula I and their agriculturally acceptable acid addition salts are useful as herbicides. They exhibit a herbicidal effect against the growth of undesired plants, especially against weeds, such as *Amaranthus retroflexus, Capsella bursa pastoris* and *Chenopodium album*, and against undesired grasses such as *Echinochloa crus-galli*.
The compounds possess a selective herbicidal effect in cotton, potato, leek and maize crops.
The compounds may be used as a mixture with herbicidal carriers or diluents. The resulting herbicidal compositions may be applied to the soil or to the weeds with conventional applicator equipment in accordance with conventional methods. Such application may be effected after emergence of the weeds or in advance of an anticipated emergence of weeds. The active agents may be formulated into suitable compositions, such as suspensions, emulsions, pastes and granulates, and may then be diluted to the desired concentration before use.
The production of the compositions is effected in known manner by intimately mixing and grinding a compound of Formula I or an agriculturally acceptable acid addition salt thereof as active agent with suitable carrier materials, optionally with the addition of dispersion agents or solvents which are inert towards the active agent. In order to produce solid application forms of the compositions, e.g. dusting agents, strewing agents and granulates, the active agent may be mixed with solid carriers. Examples of solid carriers are kaolin, talc, chalk, limestone and cellulose powder.
Substances improving adhesion on the plants and plant parts and/or allowing better wettability or dispersibility may likewise be incorporated into the compositions.
Spraying powders may be obtained by mixing and grinding the active agent in a suitable device until the mixture is homogeneous. Solid carriers for the solid application forms may, for example, be used as carrier materials.
The herbicidal compositions of the invention may include suitable known herbicides, e.g. those of the urea class, saturated or unsaturated halogen fatty acids, halogen benzonitriles, halogen benzoic acids, phenoxyalkyl carboxylic acids, carbamates and triazines.
The active agent compositions may, for example, contain between 20 and 80 percent by weight of active agent. The application forms may, for example, contain between 0.01 and 5 percent by weight of active agent.
The compounds of Formula I or agriculturally acceptable acid addition salts thereof may be applied to a locus to be treated in an amount between 1 and 10 kg./hectare, depending on the compound used and the desired herbicidal effect.

Example of a herbicidal composition 25 parts of N-(4-isopropylamino-6-chloropyrimidyl-2)-carbamic acid isopropyl ester are mixed with 5 parts of a condensation product of formaldehyde and naphthalene sulphonate, 2 parts of alkyl benzene sulphonate, 5 parts of dextrine, 1 part of ammonium caseinate and 62 parts of diatomaceous earth, until a homogeneous mixture results, and this is subsequently ground until the particles are considerably smaller than 45 microns as an average.

The herbicidal effect of the compounds of the invention is illustrated by reference to the following table, which in no way limits the scope of the invention.

The results set out in the table, represented by the figures 1 to 9 signify: 1=no destruction, 9=total destruction, whereas the intermediate figures given refer to further graduations between the figures on the evaluation scale. The following table shows the effect of post-emergence treatment with 4 kg. of active agent per hectare. Evaluation was effected 28 days after application.

TABLE 1

Herbicidal effect of N-(4-isopropylamino-6-chloropyrimidyl-2)-carbamic acid isopropyl ester against

| | |
|---|---|
| *Amaranthus retroflexus* | 9 |
| *Capsella bursa pastoris* | 8 |
| *Echinochloa crus-galli* | 9 |
| *Galium aparine* | 8 |
| *Stellaria media* | 9 |
| *Senecio vulgaris* | 9 |
| Potatoes | 1 |
| Leek | 1 |
| Maize | 1 |
| Beans | 1 |

The following examples illustrate the production of the new compounds. The temperatures are indicated in degrees centigrade.

EXAMPLE 1

N-(4-isopropylamino-6-chloropyrimidyl-2)-carbamic acid isopropyl ester

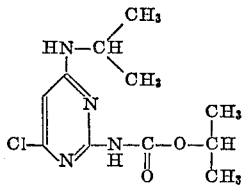

5 g. (0.04 mol) of chloroformic acid isopropyl ester are added dropwise to 6.0 g. (0.032 mol) of 2-amino-4-isopropylamino-6-chloropyrimidine in 100 cc. of absolute dioxane at room temperature, and 4.0 g. (0.04 mol) of triethyl amine are added portionwise. The mixture is gradually heated to the boil and is then boiled under reflux for 16 hours. After concentrating by evaporation in a vacuum, the residue is dissolved in chloroform and washed with water. After drying with neutral aluminium oxide, the mixture is again concentrated by evaporation. The resulting oil is heated to 100° in a high vacuum for 30 minutes in order to remove volatile impurities. The carbamic acid ester is obtained as a viscous, slightly coloured oil.

*Analysis.*—Calc'd for $C_{11}H_{17}ClN_4O_2$ (percent): Molecular weight, 272. C, 48.4; H, 6.3; N, 20.5. Found (percent): C, 48.1; H, 6.1; N, 20.8.

EXAMPLE 2

N-(4-isopropylamino-6-chloropyrimidyl-2)-N',N'-dimethyl urea

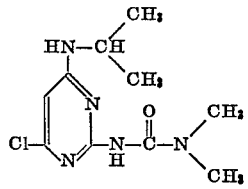

4.0 g .(0.04 mol) of dimethyl carbamoyl chloride are added dropwise at 25° to 6.0 g. (0.032 mol) of 2-amino-4-isopropylamino-6-chloropyrimidine in 100 cc. of absolute dioxane, and 4.0 g. (0.04 mol) of triethyl amine are subsequently added dropwise. The mixture is subsequently boiled under reflux for two hours. After evaporating the solvent in a vacuum, the residue is taken up in chloroform, washed with water, dried over neutral aluminium oxide and again concentrated by evaporation. After removing volatile impurities at 100° in a high vacuum, the product is obtained as a high viscous oil.

*Analysis.*—Calc'd for $C_{10}H_{16}ClN_5O$ (percent): Molecular weight, 257.7. C, 46.6; H, 6.3; Cl, 13.8; N, 27.2. Found (percent): C, 45.9; H, 6.5; Cl, 13.4; N, 26.9.

EXAMPLE 3

2-chloroacetylamino-4-isopropylamino-6-chloropyrimidine

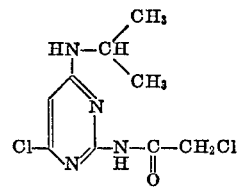

3.7 g. (0.033 mol) of chloroacetyl chloride are added dropwise at 25° to 5 g. (0.027 mol) of 2-amino-4-isopropylamino-6-chloropyrimidine in 50 cc. of absolute dioxane, and 3 g. (0.03 mol) of triethyl amine are subsequently added dropwise. The mixture is boiled under reflux for 3 hours, is cooled, the resulting hydrochloride of the triethyl amine is filtered off, and the filtrate is evaporated to dryness in a vacuum. The residue is dissolved in alcohol and precipitated with water. The precipitated product is recrystallized from benzene. The product has a melting point not lower than 340°.

*Analysis.*—Calcd. for $C_9H_{12}Cl_2N_4O$ (percent):Molecular weight, 263.1. C, 41.1; H, 4.6; Cl, 26.9; N, 21.3. Found (percent): C, 41.0; H, 4.3; Cl, 26.5; N, 20.9.

The following compounds of Formula I are obtained in a manner analogous to that described in Examples 1 to 3.

| Example | R₁ | R₂ | Z | Empirical formula | Molecular weight | Melting point, °C. | Analysis, percent ||||||||
|---|---|---|---|---|---|---|---|---|---|---|---|---|---|---|
| | | | | | | | Calculated |||| Found ||||
| | | | | | | | C | H | Cl | N | C | H | Cl | N |
| 4 | H | i-C₃H₇ | CCl₃ | C₉H₁₀Cl₄N₄O | 332.0 | 138 | 32.6 | 3.0 | 42.7 | 16.9 | 32.2 | 3.3 | 42.1 | 16.5 |
| 5 | H | i-C₃H₇ | O-⟨⟩ | C₁₄H₁₅ClN₄O₂ | 306.8 | | 54.8 | 6.1 | 14.9 | 20.1 | 54.9 | 5.4 | 13.1 | 19.5 |
| 6 | H | Sec. C₄H₉ | CH₂Cl | C₁₀H₁₄Cl₂N₄O | 277.2 | ¹300 | 43.3 | 5.1 | 25.6 | 20.2 | 43.8 | 5.2 | 25.2 | 19.1 |
| 7 | H | Sec. C₄H₉ | CCl₃ | C₁₀H₁₂Cl₄N₄O | 346.0 | | 34.7 | 3.5 | 41.0 | 16.2 | 35.1 | 3.8 | 40.8 | 16.1 |
| 8 | H | i-C₃H | NHCH₃ | C₉H₁₄ClN₅O | 243.5 | 208 | 44.3 | 5.8 | 14.5 | 29.7 | 43.8 | 5.6 | 14.0 | 28.3 |
| 9 | H | Sec. C₄H₉ | N(CH₃)₂ | C₁₁H₁₈ClN₅O | 271.8 | | 48.6 | 6.7 | 13.0 | 25.8 | 47.9 | 6.5 | 13.4 | 25.4 |

¹ Decomposition.

What is claimed is:
1. A compound of the formula:

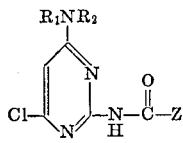

wherein $R_1$ is hydrogen or alkyl of 1 to 6 carbon atoms,
$R_2$ is alkyl of 1 to 6 carbon atoms, and
Z is alkoxy of 1 to 6 carbon atoms, phenyl, phenoxy, monoalkylamino of 1 to 6 carbon atoms, dialkylamino, each alkyl substitutent thereof having 1 to 6 carbon atoms, alkyl of 1 to 6 carbon atoms, or halogenated alkyl of 1 to 6 carbon atoms, or an agriculturally acceptable acid addition salt thereof.

2. The compound of claim 1, which is N-(4-isopropylamino-6 - chloropyrimidyl-2)-carbamic acid isopropyl ester.

3. The compound of claim 1, which is N-(4-isopropylamino-6-chloropyrimidyl-2)-N',N'-dimethyl urea.

4. The compound of claim 1, which is 2-chloroacetylamino-4-isopropylamino-6-chloropyrimidine.

5. The compound of claim 1, which is 2-trichloroacetylamino-4-isopropylamino-6-chloropyrimidine.

6. The compound of claim 1, which is N-(4-isopropylamino-6-chloropyrimidyl-2)-carbamic acid phenyl ester.

7. The compound of claim 1, which is 2-chloroacetylamino-4-sec.butylamino-6-chloropyrimidine.

8. The compound of claim 1, which is 2-trichloroacetylamino-4-sec.butylamino-6-chloropyrimidine.

9. The compound of claim 1, which is N-(4-isopropylamino-6-chloropyrimidyl-2)-N'-methyl urea.

10. The compound of claim 1, which is N-(4-sec.butylamino-6-chloropyrimidyl-2)-N',N'-dimethyl urea.

References Cited
UNITED STATES PATENTS
2,748,124   5/1956   Burtner _____ 260—256.4

ALEX MAZEL, Primary Examiner
R. V. RUSH, Assistant Examiner

U.S. Cl. X.R.
71—92